United States Patent
Mohsenian

(10) Patent No.: US 7,826,530 B2
(45) Date of Patent: *Nov. 2, 2010

(54) USE OF OUT OF ORDER ENCODING TO IMPROVE VIDEO QUALITY

(75) Inventor: Nader Mohsenian, Lawrence, MA (US)

(73) Assignee: Broadcom Corporation, Irvine, CA (US)

(*) Notice: Subject to any disclaimer, the term of this patent is extended or adjusted under 35 U.S.C. 154(b) by 1694 days.

This patent is subject to a terminal disclaimer.

(21) Appl. No.: 11/035,943

(22) Filed: Jan. 14, 2005

(65) Prior Publication Data

US 2006/0159166 A1 Jul. 20, 2006

(51) Int. Cl.
*H04N 7/12* (2006.01)
*H04N 11/02* (2006.01)
*H04N 11/04* (2006.01)
*H04B 1/66* (2006.01)

(52) U.S. Cl. .............................................. 375/240.03
(58) Field of Classification Search ....................... None
See application file for complete search history.

(56) References Cited

U.S. PATENT DOCUMENTS

| 5,294,974 | A | * | 3/1994 | Naimpally et al. | ....... 348/395.1 |
| RE35,158 | E | * | 2/1996 | Sugiyama | ................ 348/401.1 |
| 5,606,371 | A | * | 2/1997 | Gunnewiek et al. | .... 375/240.03 |
| 5,986,712 | A | * | 11/1999 | Peterson et al. | ........ 375/240.14 |
| 5,991,503 | A | * | 11/1999 | Miyasaka et al. | ........... 386/111 |
| 6,028,965 | A | * | 2/2000 | Normile | ..................... 382/250 |
| 6,343,908 | B1 | * | 2/2002 | Oudsten et al. | ............. 414/537 |
| 6,611,624 | B1 | * | 8/2003 | Zhang et al. | ................ 382/232 |

* cited by examiner

*Primary Examiner*—Nhon T Diep
(74) *Attorney, Agent, or Firm*—McAndrews Held & Malloy, Ltd.

(57) ABSTRACT

Described herein is a video encoder that includes a memory unit, a selector, and an encoding processor. The memory unit stores a plurality of pictures. The selector accesses the plurality of pictures in the memory unit. The selector initially accesses a first picture, followed by another picture, followed by one or more pictures. The one or more pictures are presented to the video encoder between the first picture and the another picture. The encoding processor encodes the first picture independently, then encodes the another picture independently, and finally, the one or more pictures are encoded. The output of the encoding processor is a first coded picture, another coded picture, and one or more coded pictures respectively.

8 Claims, 5 Drawing Sheets

USE OF OUT OF ORDER ENCODING TO IMPROVE VIDEO QUALITY

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Digital video encoders may use variable bit rate (VBR) encoding. VBR encoding can be performed in real-time or off-line. Real-time VBR encoding will typically have an associated Quality of Service (QoS) that specifies transmission delay, absolute time variation, and information loss. Also, the transmission of real-time video streams is resource-intensive as it requires a large bandwidth. Efficient utilization of bandwidth will increase channel capacity, and therefore, revenues of video service providers will also increase.

VBR encoded video is bursty in nature, and uncontrolled burstiness will lead to inefficient use of bandwidth. To guarantee a QoS level, rate control is essential. VBR encoding can achieve improved coding efficiency by better matching the encoding rate to the video complexity and available bandwidth if the burstiness of the video can be controlled. Therefore, a need exists for a system and method to realize bandwidth savings in variable bit-rate video encoders. Bandwidth savings can increase the channel multiplexing capability while maintaining the video quality desired by the application, or increase the video quality while maintaining the channel throughput.

BRIEF SUMMARY OF THE INVENTION

Described herein are video encoder(s) and method(s) for improving the video quality of coded video data.

In one embodiment, there is presented a video encoder that includes a memory unit, a selector, and an encoding processor. The memory unit stores a plurality of pictures. The selector accesses the plurality of pictures in the memory unit. The selector initially accesses a first picture, followed by another picture, followed by one or more pictures. The one or more pictures are presented to the video encoder between the first picture and the another picture. The encoding processor encodes the first picture independently, then encodes the another picture independently, and finally, the one or more pictures are encoded. The output of the encoding processor is a first coded picture, another coded picture, and one or more coded pictures respectively.

In another embodiment, a method for encoding video is presented. The video to be encoded is comprised of a plurality of pictures. A first picture, in the plurality of pictures, is encoded independently to generate a first coded picture. In the plurality of pictures, one or more pictures are skipped, and another picture is encoded independently to generate another coded picture. Prior to encoding, the another picture is after the one or more pictures.

In another embodiment, a video encoder circuit comprising a processor and a memory is presented. The memory is connected to the processor and stores a plurality of instructions executable by the processor. The execution of said instructions causes video to be encoded as described in the method herein.

These and other advantages and novel features of the present invention, as well as illustrated embodiments thereof will be more fully understood from the following description and drawings.

DETAILED DESCRIPTION OF THE INVENTION

According to certain aspects of the present invention, a video encoder and method of video encoding improve video quality using out of order encoding. The foregoing improves the video quality by optimally allocating bandwidth to the most highly coded pictures. Bandwidth savings can also increase the channel multiplexing capability while maintaining the video quality desired by the application.

Figure 1:
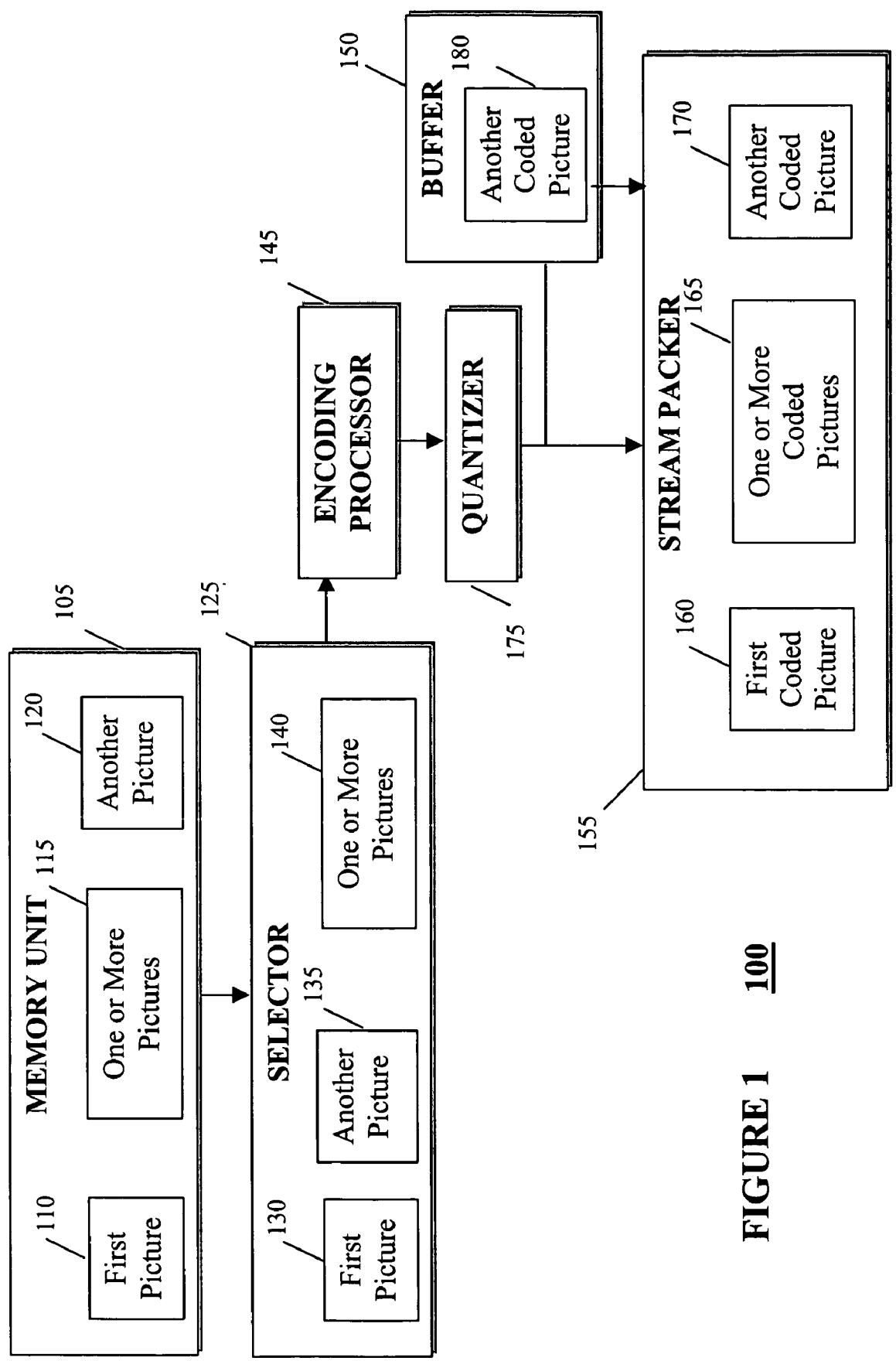
FIG. 1 is a block diagram of an exemplary video encoder in accordance with an embodiment of the present invention.

A video encoder 100 is presented in FIG. 1. The video encoder 100 comprises a memory unit 105, a selector 125, an encoding processor 145, a quantizer 175, a buffer 150, and a stream packer 155. The memory unit 105 stores a plurality of pictures 110, 115, and 120 in the order video is captured and presented to the video encoder. The selector 125 accesses the plurality of pictures 110, 115, and 120 out of order. The encoding processor 145 encodes the plurality of pictures 110, 115, and 120 in the order in which they were accessed by the selector 125. The quantizer 175 quantizes the output of the encoding processor 145. The stream packer 155 inserts another coded picture 180, that is stored by the buffer 150, after the one or more coded pictures 165.

The memory unit 105 stores a first picture 110, one or more pictures 115, and another picture 120. The first picture 110 and the one or more pictures 115 can form a first Group of Pictures (GOP). The another picture 120 can be a part of a second GOP.

The selector 125 accesses the first picture 110 initially. The first picture 110 may be stored until used by the encoding processor 145. A first picture 130 illustrates the order that is accessed. The another picture 120 is accessed after the first picture 110. Another picture 135 illustrates that the another picture 120 is accessed second. Lastly, the one or more pictures 115 are accessed after the another picture 120 and shown as one or more pictures 140. The one or more pictures 115 arrive between the first picture 110 and the another picture 120, and encoding is performed out-of-order.

The encoding processor 145 encodes the first picture 130 independently and encodes the another picture 135 independently, thereby generating a first coded picture 160 and another coded picture 180 respectively. Encoding the one or more pictures 140 generates one or more coded pictures 165. A number of bits encoding the one or more coded pictures 165 is a function of a number of bits in the another coded picture 170 as will be described further in reference to FIG. 4. Typically, independently coded pictures will contain more bits and contribute more greatly to the visual quality than will pictures that are not independently coded.

The quantizer 175 is used to prevent output overflow. The quantizer 175 may be considered part of the encoding processor 145 in that it's output bandwidth is controlled by the encoding processor 145.

The buffer 150 is a delay device for storing the another coded picture 180. The stream packer 155 inserts the another coded picture 180 after the one or more coded pictures 165 as illustrated in block 170.

Figure 2:
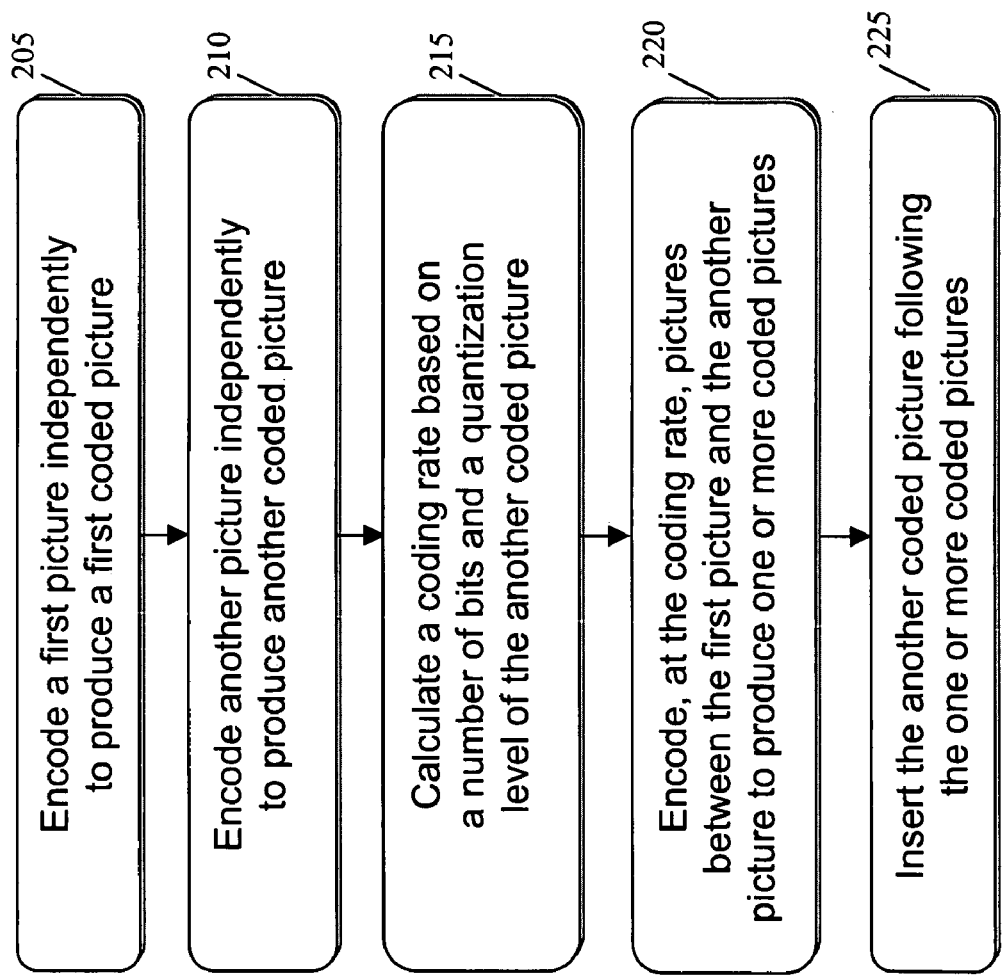
FIG. 2 is a flow diagram of an exemplary method for encoding video in accordance with an embodiment of the present invention.

Referring to FIG. 2, there is presented a flow diagram 200 for depicting a method for encoding video. The method comprises encoding a first picture independently to produce a first coded picture 205, encoding another picture independently to produce another coded picture 210, calculating a coding rate based on a number of bits and a quantization level of the another coded picture 215, encoding, at the coding rate, pictures between the first picture and the another picture to produce one or more coded pictures 220, and inserting the another coded picture following the coded group of pictures 225.

Skipping one or more pictures and going from 205 to 210 can be facilitated by a temporary storage while encoding another picture independently, since the another picture is after the one or more pictures.

The another coded picture can be stored while encoding the one or more pictures 220. Since the another coded picture is generated first, the number of bits in the one or more coded pictures can be a function of a number of bits in the another coded picture. Likewise, the number of bits used to quantize the one or more coded pictures can be based on the number of bits in the another coded picture. A quantizer value scales information such as that obtained from a Discrete Cosine Transform (DCT) or other transformed coefficients. Quantized results are entropy coded and then bits are generated. A quantizer level can produce a number of bits in the another coded picture and the one or more coded pictures. The quantizer levels in one or more coded pictures can be based on the quantizer levels of another coded picture.

Typically, a video encoder needs to maintain a target video quality while not exceeding the specified peak and long-term average bit rates. Quality of service (QoS) can be determined subjectively or objectively. Subjectively, people can be asked to rank the visual quality of service in different types of video sequences. Objectively, transmission delay, absolute time variation, and information loss can be measured. Transmission delay is the average time between encoding and decoding. Time variation occurs when the time for transmitting coded pictures varies relative to the time expected at the decoder. Information loss may occur if the coded data for a given picture in time exceeds the available bandwidth. If variable-rate video encoding is real-time, there is a trade-off between the burstiness of the traffic, the quality of the video, and the buffering requirements.

The rate control algorithm in a video encoder dictates the quantization resolution that directly controls the number of bits used to encode a picture. By using an output buffer to smooth the bit rate variation, the encoder can maintain a constant output bit rate regardless of the picture type being coded. A smoothing algorithm can use the fullness of the buffer as a limit on the number of bits particular coded pictures can contain without causing overflow. Coarse quantization generates a smaller number of bits per picture when the buffer is almost full. Finer quantization can be used when the buffer is almost empty. Smoothing algorithms lead to variable video quality and underutilization of bandwidth.

For example if an output rate from the encoder is selected as the peak bit rate of individual pictures, bandwidth may be highly under-utilized when the peak-to-average rate ratios are high. If an output rate from the encoder is selected as the mean bit rate of all pictures, an encoder may suffer from unacceptable losses and delays. A compromise between these two methods of rate control may be made if the acceptable level of information loss and the probability density function (PDF) of the bit rate can be predicted, but even with this information, highly coded independent pictures are the most likely to be affected by information loss. Degraded independent pictures will affect the visual QoS. Therefore a system and method that allocates bandwidth dynamically may result in the same or even better QoS.

Figure 3B:
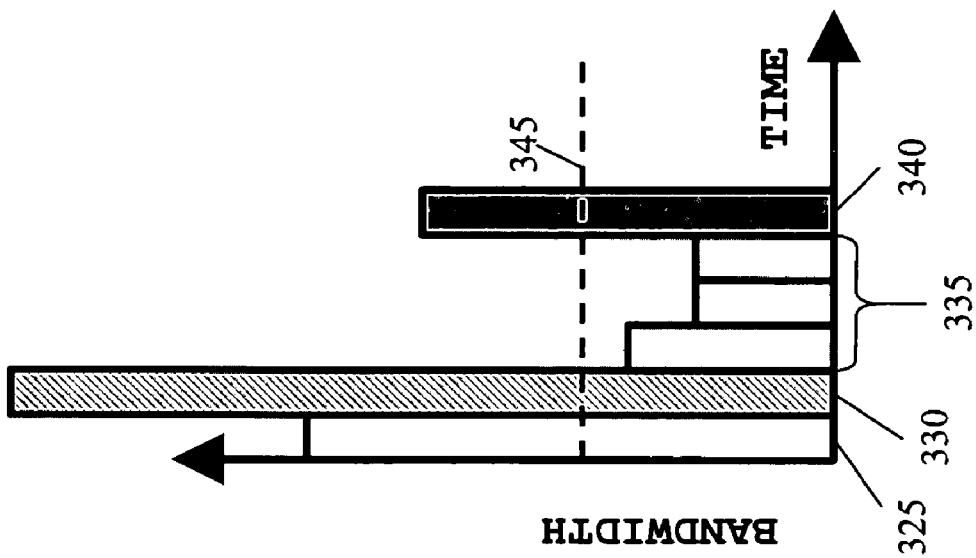
FIG. 3B is a second exemplary graph of bandwidth utilization over time.
Figure 3A:
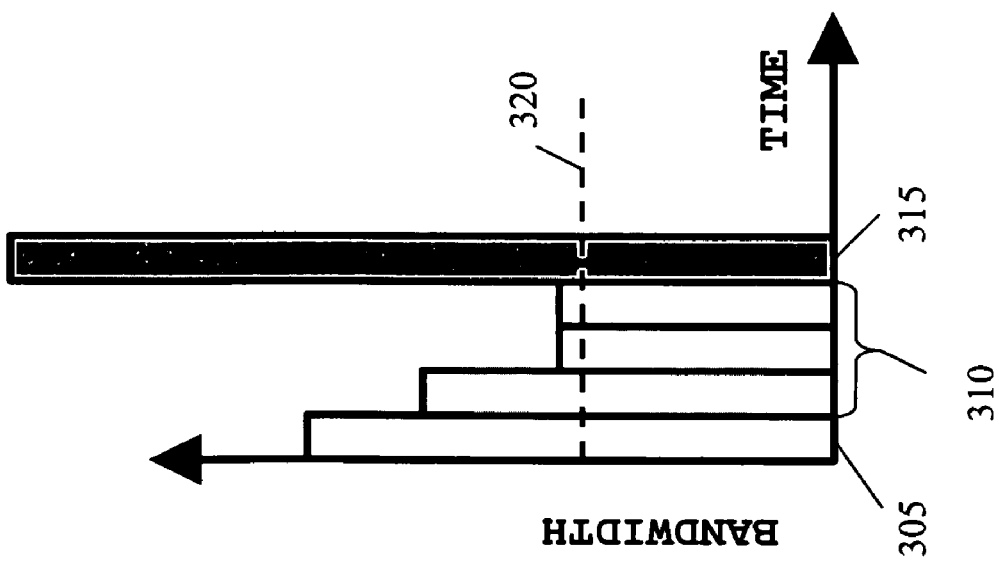
FIG. 3A is a first exemplary graph of bandwidth utilization over time.

In FIG. 3A, a graph of bandwidth utilization over time 301 illustrates a difference in absolute bit rate from picture to picture. Depicted as areas in FIG. 3A are bits in a first coded picture 305, bits in one or more coded pictures 310, and bits in another coded picture 315. An average bandwidth level 320 is exceeded by the first coded picture 305 and the one or more pictures 310. Furthermore, the another coded picture exceeds the allocated bandwidth level 320 more substantially than the first coded picture 305.

In FIG. 3B, a graph of bandwidth utilization over time 302 illustrates a benefit of having an early another coded picture 330. Depicted as areas in FIG. 3B are bits in a first coded picture 325, bits in one or more coded pictures 335, and bits in another coded picture 340. In this graph 302, the early another coded picture 330 is available between the first coded picture 325 and the one or more coded pictures 335. In this example, the early another coded picture 330 contains more bits than the first coded picture 325. Because of this a priori information, the bits in the one or more coded pictures 335 and the another coded picture 340 are reduced in order to satisfy an average bandwidth level 345.

Figure 3D:
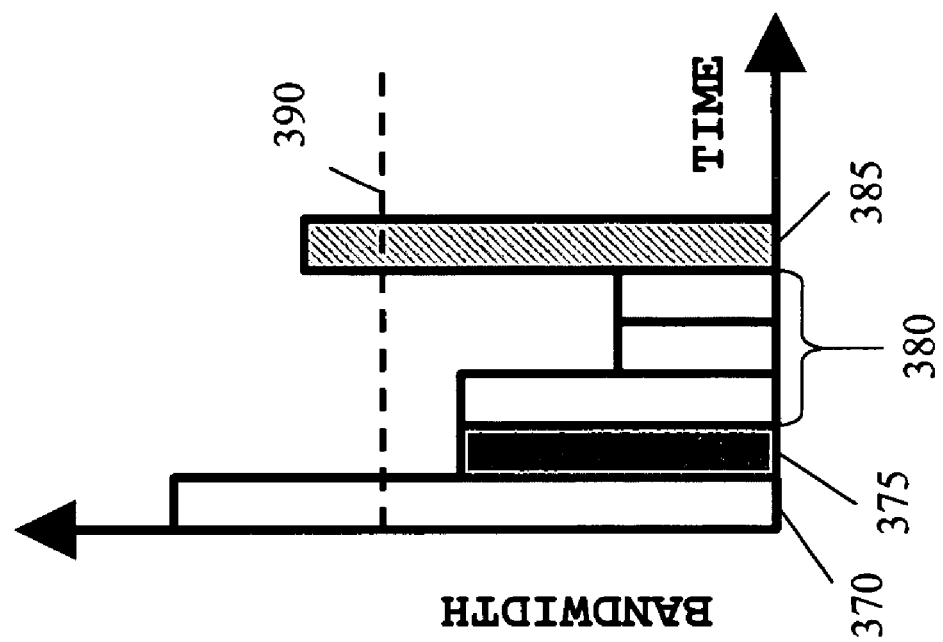
FIG. 3D is a fourth exemplary graph of bandwidth utilization over time.
Figure 3C:
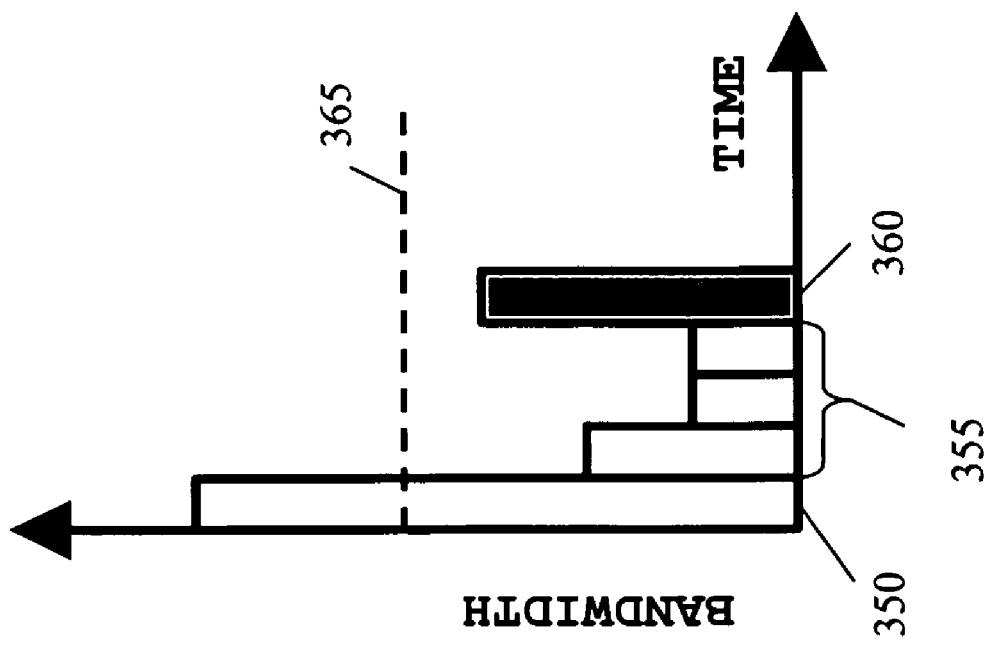
FIG. 3C is a third exemplary graph of bandwidth utilization over time.

In FIG. 3C, a graph of bandwidth utilization over time 303 illustrates a difference in absolute bit rate from picture to picture. Depicted as areas in FIG. 3C are bits in a first coded picture 350, bits in one or more coded pictures 355, and bits in another coded picture 360. An average bandwidth level 365 is above the first coded picture 350 and the one or more pictures 355. Furthermore, the another coded picture falls below the allocated bandwidth level 365.

In FIG. 3D, a graph of bandwidth utilization over time 304 illustrates a benefit of having an early another coded picture 375. Depicted as areas in FIG. 3D are bits in a first coded picture 370, bits in one or more coded pictures 380, and bits in another coded picture 385. In this graph 304, the early another coded picture 375 is available between the first coded picture 370 and the one or more coded pictures 380. In this example, the early another coded picture 375 contains fewer bits than the first coded picture 370. Because of this a priori information, the bits in the one or more coded pictures 380 and the another coded picture 385 are increased in order to satisfy an average bandwidth level 390.

Compressed digital video such as specified by the Moving Picture Experts Group (MPEG) is inherently variable-rate. Using the MPEG compression standards, video is compressed while preserving image quality through a combination of spatial and temporal compression techniques. An MPEG encoder generates three types of coded pictures: Intra-coded (I), Predictive (P), and Bi-directional (B) pictures. An I picture is encoded independently of other pictures based on a Discrete Cosine Transform (DCT), quantization, and entropy coding. I pictures are referenced during the encoding of other picture types and are coded with the least amount of compression. P picture coding includes motion compensation with respect to the previous I or P picture. A B picture is an interpolated picture that requires both a past and a future reference picture (I or P). Typically, I pictures require more bits than P pictures, and P pictures require more bits than B pictures. After coding, the frames are arranged in a deterministic periodic sequence, for example "IBBPBB" or "IBBPBBPBBPBB", which is called Group of Pictures (GOP).

An encoded picture is often assembled in portions. Each portion is associated with a particular region of the picture. The portions are often decoded in a particular order. For decoding some of the portions, data from previously decoded portions is needed,.

An exemplary video encoding standard is the ITU-H.264 Standard (H.264). H.264 is also known as MPEG-4, Part 10, and Advanced Video Coding. In the H.264 standard video is encoded on a frame by frame basis, and frames are encoded on a macroblock by macroblock basis. H.264 specifies the use of spatial prediction, temporal prediction, transformation, interlaced coding, and lossless entropy coding to compress the macroblocks. The term picture is used throughout this specification to generically refer to frames, pictures, macroblocks, or portions thereof.

Figure 4:
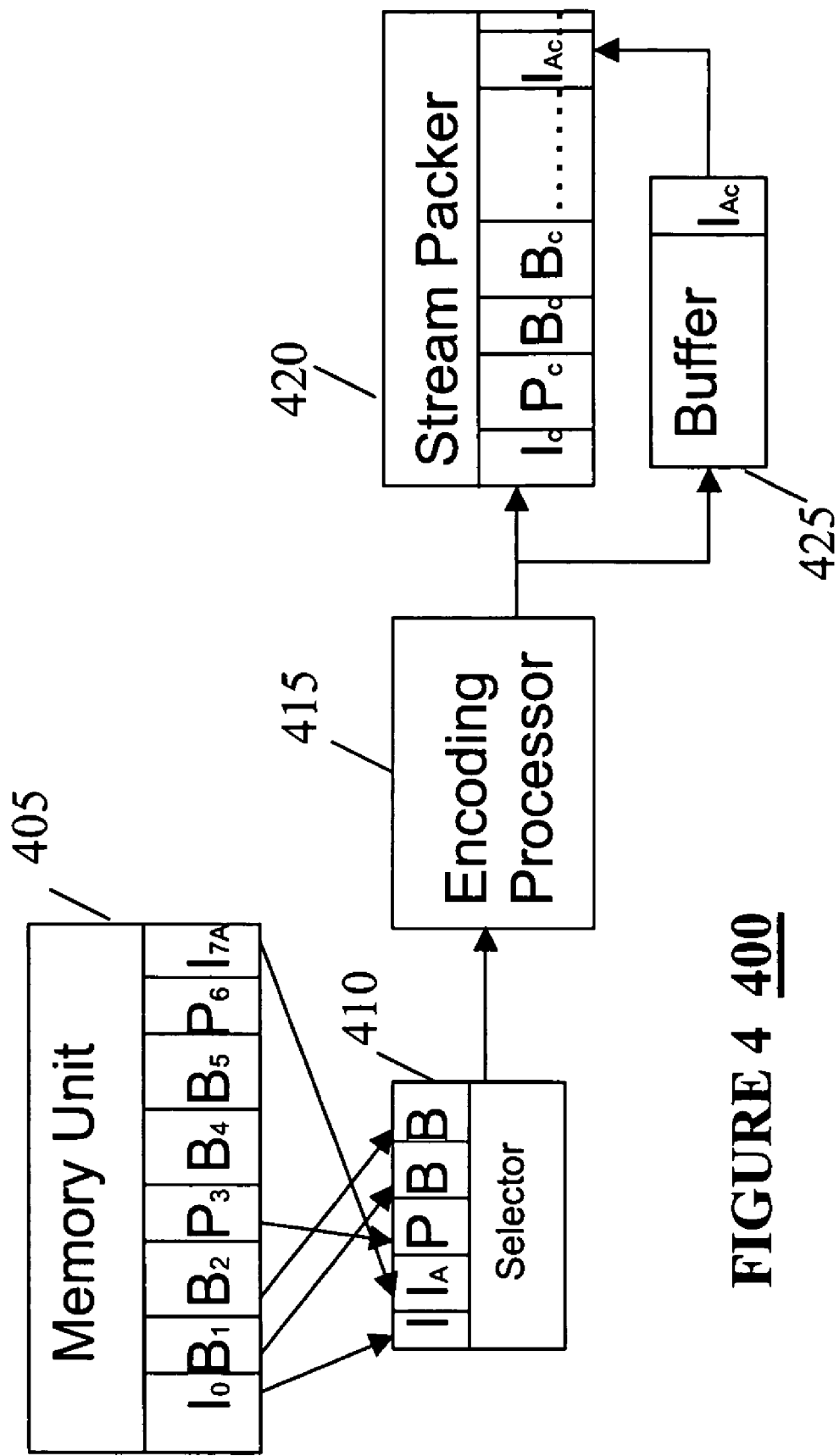
FIG. 4 is a block diagram of an exemplary MPEG video encoder in accordance with an embodiment of the present invention.

An exemplary MPEG video encoder 400 is presented in FIG. 4. The MPEG video encoder 400 comprises a memory unit 405, a selector 410, an encoding processor 415, a buffer 425, and a stream packer 420. The memory unit 405 stores a plurality of I, P, and B pictures. One full GOP size plus an extra (I) picture are stored in the memory unit 405. The selector 410 accesses the plurality of pictures, wherein another picture is accessed before one or more pictures. The encoding processor 415 encodes the plurality of pictures in the order in which they were accessed by the selector 410. The stream packer 420 inserts another coded picture, that is stored by the buffer 425, after one or more coded pictures.

FIG. 4 shows buffering arrangement for the proposed out of order intra-coded mode of encoding operation. A group of pictures presented to the video encoder 400 is first stored in a memory unit 405 and then selected by the selector 410 for encoding. The first picture selected is I and the second picture selected is $I_A$. Since the invention encodes $I_A$ immediately after I, all picture types between I and $I_A$ as well as I and $I_A$ are to be stored in a memory unit 405 before encoding starts. The encoding order is first I, then $I_A$, followed by P, and last two Bs. Therefore, the presentation order to encoding engine is "$II_A$PBB". It should be noted that P and Bs selected immediately after $I_A$ refer to I and not $I_A$ for motion prediction. After picture $I_A$ is encoded, its compression parameters will be digested by the encoding processor 415 and used to partition the remaining bandwidth for other pictures that follow in the encoding path. Since $I_A$ is an out-of-order picture, its compressed version $I_{AC}$ is stored in the buffer 425 and inserted in the bit-stream after some delay. $I_A$ and $I_{AC}$ will be used to compress future P and B pictures that were input after $I_A$.

The task of how "expensively" one would compress an I picture or how "cheaply" one would compress P or B is carried out by the encoding processor 415. In real-time (one-pass) encoding, the encoding processor 415 is restricted to digesting local statistical changes from which bits-quantization relationships are established. Any feedback would be useful in enhancing the aforementioned parameters. However, in most popular video arenas such as consumer electronics, where cost minimizations of a hardware compression solution is important, the use of information feedback (in form of re-encoding, fast "look-ahead" estimation, etc) is very costly and would necessitate the use of many compute cycles and larger silicon size.

The digestion rate of the encoding processor 415 with regard to intra-coded (I) pictures is accelerated in this invention. Since such pictures are "expensively" coded, their improvement would result in better video quality. In this invention, the encoding of an I picture, which in conventional mode would be done after several number of pictures, takes precedence over one or more pictures. A conventional encoder will first process and encode picture $I_0$ followed by $P_3$, $B_1$, $B_2$, etc . . . until picture $I_n$ arrives and gets encoded. In the current invention, the video encoder 400 encodes back-to-back I pictures at the beginning of the encoding sequence. A first picture presented to the encoder is an I picture ($I_0$) and a second picture presented to the encoder in an I picture ($I_n$). Knowing the characteristics of at least one I picture a prior I allows the rate control algorithm to place more emphasis on "expensively" encoded (I) pictures. In this twin-I encoding mode the "expensive" I pictures are more tuned to local statistical changes and their precedence to the rest of the non-I's in-between ensures the optimum utilization of the allotted bandwidth in real-time one-pass encoding. Similarly all other intra-coded pictures which appear after non-intra-coded pictures in-between would be encoded prior to encoding of said "in-between" non-intra-coded pictures. The out-of-order pictures are to be saved in a buffer 425 in compressed form and inserted in outgoing compressed bit-stream by the stream packer 420 after some delay so that the video decoder would display them at the correct time interval.

Accordingly, it is possible to look ahead of a GOP to determine changes required in a rate profile to maintain a target video quality. This rate profile is used by the encoding processor to determine how "expensively" or "cheaply" pictures are coded. This can significantly improve both video quality and encoding efficiency since future statistics are available before the current GOP is encoded. A large number of bits will be allocated while coding complex and high-motion segments, and fewer bits will be allocated during relatively still scenes so that the target video quality can be maintained. A quantization scale factor can be varied to maintain the required bit rate profile while satisfying the long-term bit rate For example, an I frame may be very large and may require five to ten times the number of bits of an average P frame. To solve this problem, looking ahead at an I frame will determine when high rates will be required and data can be sent earlier to reduce the overall rate. Effective utilization of the bandwidth without overflow is possible.

It is also beneficial to look ahead by more than one I picture and average bit rates over a larger interval. Larger look-ahead periods imply smoother transmission, but there will be a tradeoff in memory usage and transmission delay.

The embodiments described herein may be implemented as a board level product, as a single chip, application specific integrated circuit (ASIC), or with varying levels of a video encoder circuit integrated with other portions of the system as separate components.

The degree of integration of the video encoder circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

Limitations and disadvantages of conventional and traditional approaches will become apparent to one of ordinary skill in the art through comparison of such systems with the present invention as set forth in the remainder of the present application with reference to the drawings.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on MPEG-4 encoded video data, the invention can be applied to a video data encoded with a wide variety of standards.

Therefore, it is intended that the present invention not be limited to the particular embodiment disclosed, but that the present invention will include all embodiments falling within the scope of the appended claims.

The invention claimed is:

1. A method for encoding video comprising a plurality of pictures, said method comprising:
    encoding a first picture independently, thereby generating a first coded picture;
    skipping one or more pictures from the plurality of pictures;
    encoding another picture independently, thereby generating another coded picture, wherein the another picture is after the one or more pictures; and
    encoding the one or more pictures, thereby generating one or more coded pictures, wherein a number of bits in the one or more coded pictures is a function of a number of bits in the another coded picture.

2. The method of claim 1, wherein encoding the one or more pictures further comprises:
    producing quantizer levels in the one or more coded pictures, wherein the quantizer levels in the one or more coded pictures are based on the number of bits in the another coded picture.

3. The method of claim 1, further comprising:
    storing the another coded picture while encoding the one or more pictures.

4. The method of claim 3, further comprising:
    inserting the another coded picture after the one or more coded pictures.

5. A video encoder circuit, comprising a processor, and a memory connected to the processor, the memory storing a plurality of instructions executable by the processor, wherein execution of said instructions causes:
    encoding a first picture independently, thereby generating a first coded picture;
    skipping one or more pictures from the plurality of pictures;
    encoding another picture independently, thereby generating another coded picture, wherein the another picture is after the one or more pictures; and
    encoding the one or more pictures, thereby generating one or more coded pictures, wherein a number of bits in the one or more coded pictures is a function of a number of bits in the another coded picture.

6. The video encoder circuit of claim 5, wherein encoding the one or more pictures further comprises:
    producing quantizer levels in the one or more coded pictures, wherein the quantizer levels in the one or more coded pictures are based on the number of bits in the another coded picture.

7. The video encoder circuit of claim 5, wherein execution of said instructions further causes:
    storing the another coded picture while encoding the one or more pictures.

8. The video encoder circuit of claim 5, wherein execution of said instructions further causes:
    inserting the another coded picture after the one or more coded pictures.

* * * * *